United States Patent
Dinon et al.

(10) Patent No.: US 8,616,246 B2
(45) Date of Patent: Dec. 31, 2013

(54) INSULATED PIPE AND METHOD FOR PREPARING THE SAME

(75) Inventors: John L. Dinon, Lawrence, MA (US); Hobart C. Kalkstein, Carlisle, MA (US); Nirmalya Maity, Acton, MA (US); Ravijit Paintal, Lexington, MA (US); Aaron H. Johnson, Lexington, MA (US); Andries Du Plessis, Winchester, MA (US)

(73) Assignee: Cabot Corporation, Boston, MA (US)

( * ) Notice: Subject to any disclaimer, the term of this patent is extended or adjusted under 35 U.S.C. 154(b) by 938 days.

(21) Appl. No.: 11/916,646

(22) PCT Filed: Jun. 6, 2006

(86) PCT No.: PCT/US2006/021864
§ 371 (c)(1),
(2), (4) Date: Nov. 13, 2008

(87) PCT Pub. No.: WO2006/133155
PCT Pub. Date: Dec. 14, 2006

(65) Prior Publication Data
US 2009/0205737 A1    Aug. 20, 2009

Related U.S. Application Data

(63) Continuation-in-part of application No. 11/337,050, filed on Jan. 21, 2006, now abandoned.

(60) Provisional application No. 60/687,672, filed on Jun. 6, 2005.

(51) Int. Cl.
*F16L 9/14*    (2006.01)

(52) U.S. Cl.
USPC .................. 138/149; 138/148; 138/113

(58) Field of Classification Search
USPC .................. 138/148, 149, 112–114
See application file for complete search history.

(56) References Cited

U.S. PATENT DOCUMENTS

| 1,921,468 A | 8/1933 | Jack |
| 3,032,070 A | 5/1962 | Isenberg |

(Continued)

FOREIGN PATENT DOCUMENTS

| DE | 102 56 553 A1 | 6/2004 |
| GB | 2296749 A | 7/1996 |

(Continued)

OTHER PUBLICATIONS

International Search Report dated Jan. 3, 2007, in PCT/US06/21864.

(Continued)

*Primary Examiner* — Patrick F Brinson (57) ABSTRACT

The invention provides an insulated pipe-in-pipe assembly comprising (a) at least one inner pipe, (b) an outer pipe disposed around the at least one inner pipe so as to create an annular space between the outer and inner pipes, (c) porous, resilient, compressible material disposed in the annular space, and (d) a remnant of a container that previously was positioned in the annular space and previously held the compressible material in a volume less than the volume of the compressible material in the annular space. The invention also provides a method for making such an insulated pipe-in-pipe assembly.

27 Claims, 4 Drawing Sheets

(56) References Cited

U.S. PATENT DOCUMENTS

| | | | |
|---|---|---|---|
| 3,547,161 A | 12/1970 | Reece et al. | |
| 3,935,632 A | 2/1976 | Maxson | |
| 3,996,654 A | 12/1976 | Johnson | |
| 4,040,165 A | 8/1977 | Miessler et al. | |
| 4,273,161 A | 6/1981 | McLaughlin | |
| 4,348,243 A | 9/1982 | Craubner | |
| 4,581,804 A | 4/1986 | McLaughlin | |
| 4,680,070 A * | 7/1987 | Hughes | 156/218 |
| 5,183,299 A | 2/1993 | Hallerstrom et al. | |
| 5,316,816 A | 5/1994 | Sextl et al. | |
| 5,775,379 A | 7/1998 | Manofsky et al. | |
| 5,792,540 A | 8/1998 | Hughes | |
| 5,858,489 A | 1/1999 | Beauquin | |
| 6,068,027 A | 5/2000 | Miller | |
| 6,085,839 A | 7/2000 | Wyant et al. | |
| 6,110,310 A | 8/2000 | Eyhorn et al. | |
| 6,132,837 A | 10/2000 | Boes et al. | |
| 6,145,547 A | 11/2000 | Villatte | |
| 6,196,272 B1 | 3/2001 | Davis et al. | |
| 6,216,745 B1 | 4/2001 | Augustynowicz et al. | |
| 6,221,456 B1 | 4/2001 | Pogorski et al. | |
| 6,382,259 B1 | 5/2002 | Codling | |
| 6,397,895 B1 | 6/2002 | Lively | |
| 6,399,000 B1 | 6/2002 | Carr | |
| 6,464,229 B1 | 10/2002 | Kögler et al. | |
| 6,527,015 B2 | 3/2003 | Lively | |
| 6,598,283 B2 | 7/2003 | Rouanet et al. | |
| 6,770,584 B2 | 8/2004 | Barney et al. | |
| 6,854,487 B2 * | 2/2005 | Witemyre et al. | 138/114 |
| 7,011,115 B1 | 3/2006 | Giovannini et al. | |
| 7,036,531 B2 | 5/2006 | Manini et al. | |
| 7,226,243 B2 | 6/2007 | Lee et al. | |
| 7,896,033 B2 | 3/2011 | Hallot et al. | |
| 2003/0101683 A1 | 6/2003 | Gregorio | |
| 2003/0215640 A1 | 11/2003 | Ackerman et al. | |
| 2004/0134556 A1 | 7/2004 | Manini et al. | |
| 2005/0047871 A1 | 3/2005 | Lee et al. | |
| 2005/0103393 A1* | 5/2005 | Foxton | 138/149 |
| 2006/0182943 A1 | 8/2006 | Eyhorn | |
| 2006/0272727 A1 | 12/2006 | Dinon et al. | |
| 2007/0102055 A1 | 5/2007 | Blair et al. | |

FOREIGN PATENT DOCUMENTS

| | | |
|---|---|---|
| JP | 2001-072408 A | 3/2001 |
| JP | 2001-174140 A | 6/2001 |
| JP | 2001-287291 A | 10/2001 |
| JP | 2005-514562 A | 5/2005 |
| WO | WO 95/00797 A1 | 1/1995 |
| WO | WO 98/34061 A1 | 8/1998 |
| WO | WO 03/056230 A1 | 7/2003 |

OTHER PUBLICATIONS

International Preliminary Report on Patentability dated Dec. 21, 2007, in PCT/US06/21864.
First Examination Report dated Mar. 11, 2011, from Australian Application No. 2006255092, filed on Jun. 6, 2006.
Notice of Acceptance dated Nov. 2, 2011, from Australian Application No. 2006255092, issued on Nov. 17, 2011.
English language translation of First Office Action dated Nov. 9, 2011, from Chinese Application No. 2006800279101, filed on Jun. 6, 2006.
Official Communication dated Jun. 23, 2010, from European Application No. 06 772 244.7, filed on Jun. 6, 2006.
Official Communication dated May 10, 2011, from European Application No. 08 010 622.2, filed on Jun. 11, 2008.
Extended European Search Report dated Sep. 1, 2008, from European Application No. 08 010 622.2, filed on Jun. 11, 2008.
English language overview of First Office Action, from Indonesian Application No. W-00200704020, filed on Jun. 6, 2006.
English language translation of First Office Action, from Japanese Application No. 2008-515815, filed on Jun. 6, 2006.
English language overview of First Office Action, from Mexican Application No. MX/a/2007/015378, filed on Jun. 6, 2006.
English language overview of Second Office Action, from Mexican Application No. Mx/a/2007/015378, filed on Jun. 6, 2006.
English language overview of Third Office Action, from Mexican Application No. Mx/a/2007/015378, filed on Jun. 6, 2006.
English language overview of First Office Action issued on Jul. 6, 2010, from Russian Application No. 2007145356, filed on Jun. 6, 2006.
Summary of Decision of Grant in Russian Application No. 2007145356, issued on Nov. 26, 2010.
Office Action dated Feb. 17, 2010, from U.S. Appl. No. 11/337,050, filed Jan. 21, 2006.
Amendment filed Jun. 30, 2010 in response to the Office Action dated Feb. 17, 2010, from U.S. Appl. No. 11/337,050, filed Jan. 21, 2006.
Final Office Action dated Sep. 14, 2010, from U.S. Appl. No. 11/337,050, filed Jan. 21, 2006.
After Final Amendment filed Nov. 15, 2010 in response to the Final Office Action dated Sep. 14, 2010, from U.S. Appl. No. 11/337,050, filed Jan. 21, 2006.
Advisory Action dated Nov. 29, 2010, from U.S. Appl. No. 11/337,050, filed Jan. 21, 2006.
Amendment filed Jan. 14, 2011 in response to the Final Office Action dated Sep. 14, 2010, from U.S. Appl. No. 11/337,050, filed Jan. 21, 2006.
Office Action dated Oct. 31, 2011, from U.S. Appl. No. 11/337,050, filed Jan. 21, 2006.
Amendment filed Jan. 31, 2012 in response to the Office Action dated Oct. 31, 2011, from U.S. Appl. No. 11/337,050, filed Jan. 21, 2006.
Final Office Action dated Apr. 12, 2012, from U.S. Appl. No. 11/337,050, filed Jan. 21, 2006.
English language translation of Second Office Action dated May 4, 2012, from Chinese Application No. 200680027910.2, filed on Jun. 6, 2006.
English language translation of Third Office Action dated Sep. 4, 2012, from Chinese Application No. 200680027910.2, filed on Jun. 6, 2006.
English language translation of Final Office Action dated Apr. 5, 2012, from Japanese Application No. 2008-515815, filed on Jun. 6, 2006.
Communication dated May 4, 2012, from European Application No. EP 06772244.7, filed on Jun. 6, 2006.
Notice of Panel Decision from Pre-Appeal Brief Review dated Oct. 2, 2012, from U.S. Appl. No. 11/337,050, filed Jan. 21, 2006.
English language translation of First Office Action dated Mar. 4, 2013, from Korean Application No. 10-2008-7000189, filed on Jun. 3, 2011.
First Office Action dated Jan. 3, 2013, from Canadian Application No. 2,611,115.
Official Communication dated May 8, 2013, from European Application No. 06 772 244.7, filed on Jun. 6, 2006.

* cited by examiner

FIG. 6

INSULATED PIPE AND METHOD FOR PREPARING THE SAME

PRIOR APPLICATIONS

This application is the U.S. national stage of International Application No. PCT/US2006/021864, filed on Jun.6, 2006, which designates the United States, published in English and claims the benefit under 35 USC §119(e) of U.S. Provisional Application 60/687,672, filed on Jun.6, 2005. International Application No. PCT/US2006/021864 is a Continuation-in-Part of U.S. patent application Ser. No.11/337,050, filed on Jan.21, 2006, which claims the benefit under 35 USC §119(e) of U.S. Provisional Application 60/687,672, filed on Jun.6, 2005.

FIELD OF THE INVENTION

This invention pertains to a thermally insulated pipe-in-pipe assembly and a method of preparing the same.

BACKGROUND OF THE INVENTION

In deep-water hydrocarbon (e.g. oil, gas or mixtures thereof) extraction, crude oil or gas is extracted from below the sea floor and transferred via a pipeline system to the surface of the water. It is critically important to maintain the temperature of the oil or gas flowing through the pipeline, which typically is extracted at elevated temperatures (e.g., 60-300° C.), at temperatures above about 40° C. to avoid the precipitation of solid materials and hydrates which can lead to plugging of the pipeline and interfere with production. As the water temperature at great depths is slightly above freezing temperature (e.g, about 4° C.), provision must be made to insulate the pipelines. Further, if oil or gas flow must be interrupted for well maintenance or because of inclement weather conditions affecting surface platforms and interrupting pumping operations, it is important to maintain the temperature of residual crudes and gases within the pipeline and other components of the pipeline system (e.g., Christmas trees or subsea trees, risers, and the like) above precipitation temperatures for the particular crudes or gases being extracted in order to minimize or completely avoid the expensive and production-interrupting necessity of declogging and/or flushing the pipeline system before resuming production.

To this end, many efforts have been made to provide economical and efficacious solutions to the problem of insulating underwater oil and gas pipeline systems. A particularly well-accepted method is to provide a pipeline comprising a pipe-in-pipe system wherein an inner pipe is surrounded by an outer pipe serving as a carrier pipe, and wherein the annular space defined by the inner pipe and outer pipe contains an insulating material. For example, U.S. Pat. No. 6,145,547 discloses a pipe-in-pipe assembly comprising a self-sustaining plate of microporous material surrounding an inner carrier pipe and encased by an outer carrier pipe, wherein a free passageway is provided for longitudinal gas flow. The assembly is maintained at reduced pressure for improved thermal insulation. U.S. Patent Application Publication 2004/0134556 A1 discloses a heat insulating system for tubular bodies (e.g., a pipe-in-pipe assembly) comprising at least two superimposed evacuated panels, each of which is separately placed around the inner pipe of the pipe-in-pipe assembly, and wherein the two opposed edges defining gaps of each of the at least two panels are placed so as not to coincide and thus eliminate a continuous passageway for the transfer of heat between the inner and outer pipes.

Similarly, there is great interest in pipelines for transporting liquefied hydrocarbons (e.g. liquefied natural gas, liquefied propane gas). In this case, thermal insulation is required to maintain the low temperature of the liquefied natural gas (about −163° C.) to avoid vaporization of the liquid due to heat transfer from the warmer surroundings.

Additionally, steam injection is often employed to maintain reservoir pressure in oil and gas fields as the fields become depleted and thus to maintain production at an economic rate. In such a technique, steam must be transported to the production site, which is often distant from the site of steam generation. Accordingly, thermal insulation of the steam-carrying pipes is required to prevent condensation of the steam.

The transfer of hot fluids and cryogenic fluids (for example industrial gases such as oxygen, nitrogen, argon and hydrogen) in industrial plants, HVAC systems, steam heating systems for corporate, municipality, or university campuses and buildings) and many other environments also requires insulation. In some of these cases, the outer pipe is a simple cover comprising a material such as aluminum cladding or PVC pipe However, existing methods of insulating pipe-in-pipe assemblies remain deficient in numerous respects. Preformed insulating panels and the like, of necessity retain gaps in insulation when placed within pipe-in-pipe assemblies, both between their opposing edges and between ends when laid end-to-end, allowing for heat transfer between inner and outer pipes, which reduces insulation efficiency and requires greater amounts of insulating materials. Maintenance of reduced pressure within the annular space of some pipe-in-pipe assemblies places great demands on forming vacuum-tight assemblies and places the performance of the assembly at risk should the vacuum be compromised. Some insulating materials such as polyurethane foam lose insulation efficiency and/or shape over service life. Other insulating materials require the use of a larger diameter outer pipe to accommodate sufficient insulating material due to less efficient insulation capabilities. Thus, there remains a need for improved methods for preparing insulated pipe-in-pipe assemblies.

BRIEF SUMMARY OF THE INVENTION

The invention provides a method of preparing an insulated pipe-in-pipe assembly, which method comprises (i) providing an assembly comprising (a) at least one inner pipe, (b) an outer pipe that is positioned around the at least one inner pipe so as to create an annular space between the exterior surface of the at least one inner pipe and the interior surface of the outer pipe, and (c) at least one container comprising porous, resilient, volumetrically compressible material, wherein the compressible material is restrained within the container and has a first volume, wherein the first volume of the compressible material is less than the unrestrained volume of the compressible material, and wherein the at least one container is disposed in the annular space, and (ii) altering the at least one container to reduce the level of restraint on the compressible material to increase the volume of the compressible material to a second volume that is greater than the first volume, thereby forming an insulated pipe-in-pipe assembly.

The invention also provides a method of preparing an insulated pipe-in-pipe assembly, which method comprises (i) providing an assembly comprising (a) at least one inner pipe, (b) a first outer pipe (or other restraining means) that is positioned around the at least one inner pipe so as to create an annular space between the exterior surface of the at least one inner pipe and the interior surface of the outer pipe, (c) optionally, at least one additional outer pipe that is positioned around the first outer pipe so as to create an annular space between the exterior surface of the first outer pipe and the interior surface of the additional outer pipe, and (d) at least one container comprising porous, resilient, volumetrically compressible material, wherein the compressible material is restrained within the container and has a first volume, wherein the first volume of the compressible material is less than the unrestrained volume of the compressible material, and wherein the at least one container is disposed in (at least one of) the annular space(s), and (ii) altering the at least one container to reduce the level of restraint on the compressible material to increase the volume of the compressible material to a second volume that is greater than the first volume, thereby forming an insulated pipe-in-pipe-in-pipe assembly.

The invention also provides an insulated pipe-in-pipe assembly comprising (a) at least one inner pipe with an exterior surface, (b) an outer pipe with an interior surface that is disposed around the at least one inner pipe, (c) an annular space between the interior surface of the outer pipe and the exterior surface of the at least one inner pipe, (d) a porous, resilient, compressible material disposed in the annular space, and (e) a remnant of a container that previously was positioned in the annular space and previously held the compressible material in a volume less than the volume of the compressible material in the annular space.

The invention also provides an insulated pipe-in-pipe assembly comprising (a) at least one inner pipe with an exterior surface, (b) a first outer pipe or other restraining means with an interior surface that is disposed around the at least one inner pipe, (c) an annular space between the interior surface of the outer pipe and the exterior surface of the at least one inner pipe, (d) at least one additional outer pipe that is positioned around the first outer pipe so as to create an additional annular surface between the exterior surface of the first outer pipe and the interior surface of an additional outer pipe (e) a porous, resilient, compressible material disposed in one or more of the annular spaces, and (f) a remnant of a container that previously was positioned in one or more of the annular spaces and previously held the compressible material in a volume less than the volume of the compressible material in the annular space(s).

The invention further provides an insulated pipe-in-pipe assembly comprising (a) at least one inner pipe with an exterior surface, (b) an outer pipe with an interior surface that is disposed around the at least one inner pipe, (c) an annular space between the interior surface of the outer pipe and the exterior surface of the at least one inner pipe, and (d) nanoporous silica disposed in the annular space, wherein the nanoporous silica has a density between 80 kg/m$^3$ and about 140 kg/m$^3$ and a thermal conductivity of about 20 mW/m·K or less when measured between a surface at about 0° C. and a surface at about 25° C.

DETAILED DESCRIPTION OF THE INVENTION

The invention provides methods of preparing an insulated pipe-in-pipe assembly and system, as well as a pipe-in-pipe assembly and system.

The inventive method of preparing an insulated pipe-in-pipe assembly comprises (i) providing an assembly comprising (a) at least one inner pipe, (b) at least one outer pipe that is positioned around the at least one inner pipe so as to create an annular space between the exterior surface of the at least one inner pipe and the interior surface of the outer pipe (and optionally additional annular spaces between the exterior surface of an outer pipe and the interior surface of an additional outer pipe), and (c) at least one container comprising porous, resilient, volumetrically compressible material, wherein the compressible material is restrained within the container and has a first volume, wherein the first volume of the compressible material is less than the unrestrained volume of the compressible material, and wherein the at least one container is disposed in the annular space (or one or more of the annular spaces in the event more than one outer pipe is utilized), and (ii) altering the at least one container to reduce the level of restraint on the compressible material to increase the volume of the compressible material to a second volume that is greater than the first volume, thereby forming an insulated pipe-in-pipe assembly.

The assembly comprising at least one inner pipe, at least one outer pipe, and at least one container can be provided by practicing any suitable sequence of steps. For example, the container(s) can be placed adjacent to the exterior surface(s) of the inner pipe(s) and/or the interior surface of the outer pipe prior to positioning of the inner pipe(s) and outer pipe to form the annular space. Alternatively, the inner pipe(s) and outer pipe can be positioned to form the annular space prior to positioning the container(s) within the annular space. Other variations will be readily apparent to the ordinarily skilled artisan within the context of the invention, and the inner pipe(s) and/or the outer pipe(s) can be manipulated to achieve the desired positioning of the inner pipe(s) and outer pipe(s).

Thus, the inventive method of preparing an insulated pipe-in-pipe assembly comprises (i) providing at least one inner pipe with an exterior surface, (ii) providing at least one outer pipe with an interior surface that is positioned around the at least one inner pipe (or outer pipe) so as to create an annular space between the exterior surface of the inner pipe and the interior surface of the outer pipe (and/or the exterior surface of an outer pipe and the interior surface of another outer pipe), (iii) providing at least one container comprising porous, resilient, volumetrically compressible material, wherein the compressible material is restrained within the container and has a first volume, and wherein the first volume of the compressible material is less than the unrestrained volume of the compressible material, (iv) positioning the at least one container so that it ultimately is disposed in the annular space(s), and (v) altering the at least one container to reduce the level of restraint on the compressible material to increase the volume of the compressible material to a second volume that is greater than the first volume, thereby forming an insulated pipe-in-pipe assembly, wherein steps (i)-(iv) can be carried out in any suitable order. For example, steps (i)-(iv) can be carried out in the order recited above. Alternatively, steps (i)-(iv) can be carried out as follows: (i) providing at least one inner pipe with an exterior surface, (ii) providing at least one container comprising porous, resilient, volumetrically compressible material, wherein the compressible material is restrained within the container and has a first volume, and wherein the first volume of the compressible material is less than the unrestrained volume of the compressible material, (iii) positioning the at least one container proximate to the exterior surface of the at least one inner pipe, (iv) providing an outer pipe with an interior surface that is positioned around the at least one inner pipe and the at least one container so as to create an annular space between the exterior surface of the at least one inner pipe and the interior surface of the outer pipe, wherein the at least one container is ultimately disposed in the annular space. Also, steps (i)-(iv) can be carried out as follows: (i) providing an outer pipe with an interior surface, (ii) providing at least one container comprising porous, resilient, volumetrically compressible material, wherein the compressible material is restrained within the container and has a first volume, and wherein the first volume of the compressible material is less than the unrestrained volume of the compressible material, (iii) positioning the at least one container proximate to the interior surface of the outer pipe, (iv) providing at least one inner pipe with an exterior surface that is positioned within the outer pipe so as to create an annular space between the exterior surface of the at least one inner pipe and the interior surface of the outer pipe, wherein the at least one container is ultimately disposed in the annular space. Variations on the above method whereby additional outer pipes are used will be readily apparent to those skilled in the art.

The insulated pipe-in-pipe assembly is typically insulated to inhibit transfer of thermal energy between the inner pipe(s) and the surrounding environment (e.g., thermally insulated). The compressible material can have any suitable thermal conductivity, desirably a thermal conductivity of about 20 mW/m·K or less (e.g., about 12 mW/m·K to about 20 mW/m·K) when measured between a surface at about 0° C. and a surface at about 25° C. The thermal conductivity can be measured, for example, in accordance with ASTM C518. It also is within the scope of the invention for the insulation to inhibit transfer of other forms of energy, for example, sound energy between the inner pipe(s) and the surrounding environment.

The inner pipe(s) and outer pipe(s) can be made of any suitable material and can be made of the same or different material. For use in underwater oil and gas transport, the pipes are typically made of metal or metal alloys, especially carbon steel, nickel steel or stainless steel. However, in other embodiments, non-metallic materials are also suitable. Non-limiting examples of suitable non-metallic pipe materials include elastomers (including silicones), thermoset polymers (including epoxies and resins), thermoplastic polymers (including polyethylene, acrylic, polycarbonate, polypropylene, polyamide, polyvinylchloride, polystyrene), polymer foams (including polyurethane foam), polymer composites (including carbon fiber-reinforced polymers, fiber glass, polymers with glass microspheres, polymers with polymer microspheres), and ceramics. In some embodiments, a sheath, concentrically-wrapped material, or cladding may be used as an inner and/or outer pipe. These may be made of the immediately above listed materials, high density polyethylene (HDPE), aluminum, steel, galvanized steel, or other suitable materials and combinations thereof. Sheath application will depend on specific material properties and non-limiting samples include wrapping, extruding, spraying, molding or heat shrinking.

In some embodiments, the outer pipe(s) comprise(s) a flexible material capable of undergoing elastic deformation upon application of pressure. The pressure can be applied to the outer surface of the outer pipe, such as when the pipe-in-pipe apparatus is submerged under water. The pressure also can be applied to the inner surface of the outer pipe, for example, when the compressible material expands against the outer pipe from within the annular space of the pipe-in-pipe apparatus.

The inner pipe(s) can comprise a flexible material as well. When the inner pipe(s) and outer pipe comprise flexible materials, the pipe-in-pipe assembly will itself be flexible, which advantageously allows the assembly to be easily deployed or coiled and/or allows for fitment in nonlinear layouts, such as in industrial plants and the like.

The wall thicknesses of the at least one inner pipe and outer pipe can be of any suitable value and typically will be chosen to provide sufficient strength for the pipes when in operation. The inner pipes(s) typically have a wall thickness providing sufficient strength to contain the pressure generated by the flow of fluid, whether liquid or gas, which can be as high as 140 MPa (20,000 psi). The outer pipe can have any strength, e.g., wall thickness, for the intended application. For example, in some deep-sea applications, the outer pipe can have a wall thickness sufficient to substantially resist pipe deformation while under high water pressure. In shallow underwater applications, or for use at atmospheric pressure (e.g., on dry land), the wall thickness of the outer pipe can be relatively thin. In yet other applications, the outer pipe can be elastic, in which case the wall thickness depends on the particular material or materials used in fabricating the outer pipe and on the pressures to which the outer pipe is subjected. As will be discussed below, the use of the insulating materials and methods of the invention allows for improved mechanical support of the inner and outer pipes. This may allow for the use of thinner inner and outer pipes than are currently required.

The inner pipe(s) and the outer pipe can have any suitable length. The choice of length can be dictated, at least in part, by limitations in manufacturing techniques, and by limitations imposed by transportation methods. The outer pipe has an interior surface that is positioned around the inner pipe(s) having an exterior surface(s). Alternatively, the inner pipe has an exterior surface that is positioned within the outer pipe having an interior surface. The placement of the pipes with respect to each other can be performed by any suitable technique. For example, one of the pipes can be held stationary while the other pipe is moved into place. When the outer pipe comprises a plastic material (e.g., thermoplastic or thermoset polymer), the outer pipe can be extruded around the inner pipe(s) to form the outer pipe while simultaneously placing the outer pipe in position around the inner pipe(s). The void space between the exterior surface(s) of the inner pipe(s) and the interior surface of the outer pipe, or the exterior surface(s) of an outer pipe and the interior surface of an additional outer pipe, is defined herein as the annular space. The annular space can be at any suitable gas pressure during or after preparation of the insulated pipe-in-pipe assembly. For example, in some embodiments involving sealed containers and equalizing the pressure in the at least one container with the pressure of the annular space to increase the volume of the compressible material, the gas pressure of the annular space prior to altering the at least one container is greater than the reduced gas pressure within the at least one container. Typically, the gas pressure within the annular space is at atmospheric pressure during and after carrying out the inventive method, though, in some embodiments, the gas pressure in the annular space may be less than atmospheric pressure, after carrying out the inventive method. In other embodiments, the gas pressure within the annular space can be above atmospheric pressure during and/or after practice of the inventive method.

The annular space and the at least one container can contain any suitable gas. Typically, the gas is air. However, in some embodiments the gas can be a gas having a lower thermal conductivity than air. Examples of such gases include argon, krypton, carbon dioxide, hydrochlorocarbons, hydrofluorocarbons, hydrochlorofluorocarbons, perfluorohydrocarbons, ethane, propane, butane, pentane, and mixtures thereof.

The container comprises a porous, resilient, and volumetrically compressible material, wherein the compressible material is restrained within the container and has a first volume, wherein the first volume of the compressible material is less than the unrestrained volume of the compressible material. When the container is altered to reduce the level of restraint on the compressible material, the compressible material will expand to a second volume that is greater than the first volume.

In a first embodiment, the at least one container is placed inside a pressure chamber and the pressure in the chamber is reduced below atmospheric pressure. The container is sealed to be gas impermeable while container is maintained at the reduced pressure in the chamber. Once the container has been sealed it is removed from the pressure chamber and the pressure outside the container returns to atmospheric conditions while the pressure inside the container is maintained at the reduced pressure level present during the sealing of the container. Of course, when the gas pressure within the sealed container is below atmospheric pressure, the sealed container and its contents will be subject to the pressure differential between atmospheric pressure outside the sealed container and the reduced gas pressure within the sealed container. The sealed container comprises a porous, resilient, volumetrically compressible material. As the container is flexible and the compressible material has an elastic compressibility, when an external pressure (in this case atmospheric pressure) is applied to the sealed container and the compressible material, the volume of the sealed container and the compressible material will decrease. Thus, in this method embodiment, the compressible material is restrained within the sealed container at the first volume by the action of atmospheric pressure upon the sealed container.

Upon altering the at least one sealed container so as to equalize the pressure in the sealed container with the pressure within the annular space, the compressible material will expand volumetrically, provided that the container allows for expansion of the compressible material. For example, the container can be physically breached (e.g., punctured or degraded) thus allowing pressure equalization and expansion of the compressible material.

In a second embodiment, the compressible material is restrained at the first volume within the at least one container. That is, the container itself restrains the compressible material without (or, alternatively, in addition to) the action of a pressure differential between the pressure within the container and the pressure outside the container. The container can comprise a single uniform material, or the container can be further equipped with at least one restraining means, wherein the restraining means maintains the compressible material in a compressed state. The restraining means can surround at least a portion of the container and may comprise, for example, at least one sheath or belt. The sheath(s) or belt(s) can comprise any suitable material, and can comprise the same or different material as the container(s). In this embodiment of the invention, sealing of the container with a gas impermeable seal or otherwise is optional.

The at least one container is positioned to be ultimately disposed in the annular space. Thus, the container(s) can be placed directly in the annular space after the outer pipe is positioned to surround the inner pipe(s). The container(s) can be placed in position with respect to the inner pipe(s) before the outer pipe is positioned to surround the inner pipe(s) such that the container(s) are in the annular space upon its formation. Finally, the container(s) can be placed in position with respect to the outer pipe before the inner pipe is positioned within the outer pipe such that the container(s) are in the annular space upon its formation.

For example, the container(s) can be placed adjacent to the exterior surface of the inner pipe(s). The container(s) can be held in place, if desired, in any suitable manner. The container(s) can be held in place with the use of at least one fastener applied to the exterior surface of the inner pipe(s), the exterior surface of the container(s), or both. Alternatively, at least one fastener can be used to hold the container(s) adjacent to the exterior surface of the inner pipe(s). If two or more containers are employed, the containers can be secured to each other in any suitable manner (e.g., using at least one fastener).

The at least one fastener can be any suitable fastener. Non-limiting examples of fasteners include adhesive compositions, adhesive tapes, bands, clips, hook-and-eyelet assemblies, and hook-and-loop fasteners. Adhesive compositions can be applied to the exterior surface of the inner pipe(s) and/or the external surface of the container(s) by brushing, rolling or by spraying. Double-sided adhesive tapes can be used as fasteners and can be applied to either the inner pipe(s) or the container(s). The container(s) itself can comprise an adhesive material. The fastener can comprise bands including elastic bands (e.g., rubber or other elastomeric bands), non-elastic bands (e.g., metal, polymer, zip-tie bands), and bands including a nonelastic portion and an elastic portion, wherein the elastic portion can comprise an elastomer or a spring(s). The band can comprise a sheath encircling the container(s) when in place on the inner pipe(s). Of course, the same considerations apply when the container(s) are placed against the interior surface of the outer pipe prior to positioning of the inner pipe(s).

Subsequently, the at least one container may be altered to reduce the level of restraint on the compressible material to increase the volume of the compressible material to a second volume that is greater than the first volume, thereby forming an insulated pipe-in-pipe assembly. In the first embodiment of the inventive method, the alteration comprises equalization of the gas pressure in the at least one container with the gas pressure in the annular space. As noted above, the compressible material within the container(s) will expand to a greater volume because the effect of the higher pressure outside the container(s) is at least partially, and desirably fully, neutralized.

In the second embodiment of the invention, the at least one container is altered to permit an increase in the volume of the compressible material and thereby form an insulated pipe-in-pipe assembly. In this regard, alteration refers to any operation that allows the compressible material to expand. Examples of suitable alterations include destroying the integrity of the container, transforming an inelastic container to an elastic container, or removing or altering the restraining means for the container. Suitable techniques for altering the container(s) can be the same as techniques for breaching sealed containers as recited herein.

After alteration of the container(s), the compressible material will expand within the annular space, advantageously expanding to substantially fill the annular space and thus provide a substantially uniform distribution of compressible material within the annular space. Subsequently, the annular space preferably is substantially free of any voids or gaps, especially such voids or gaps that degrade the thermal performance of the system.

Optionally, the inventive method comprises a further step of sealing at least one end of the pipe-in-pipe assembly. All ends of the pipe-in-pipe assembly can be sealed so as to fully enclose the annular space (while allowing product flow within one or more inner pipes). Any suitable method can be used to seal one or more ends of the pipe-in-pipe assembly, a number of which are well known in the art. In this regard, pipe-in-pipe assemblies having three or more ends are also considered to be within the scope of the invention, including, for example, pipe-in-pipe configurations having a "T" or a "Y" configuration, which configurations have three ends. Other configurations, such as a "U" expansion loop will be readily apparent to the ordinarily skilled artisan.

Typically, the pressure within the annular space is substantially at atmospheric pressure during practice of the inventive method. In the first method embodiment of the inventive method, wherein the container(s) comprises a sealed container(s) at a first volume under a reduced pressure, advantageously the pressure differential between the reduced gas pressure within the sealed container(s) and the pressure within the annular space will be maximized, and so allow for maximum expansion of the compressible materials upon equalization of the pressure within the sealed container(s) with the pressure within the annular space. If the annular space is sealed at the terminal ends of the assembly to provide a fully enclosed annular space, the pressure within the annular space can be reduced to below atmospheric pressure, preferably after equalizing the pressure within the sealed container(s) with the pressure within the annular space. The pressure within the annular space can also be maintained at atmospheric pressure or increased to above atmospheric pressure after sealing the terminal ends of the assembly.

The volume of the container(s) before altering the container(s) is less than or equal to the volume of the annular space. As a result, the annular space allows for fitment of the container(s) into the annular space and allows for at least some expansion of compressible material within the annular space. Typically, the volume of the container(s) before altering the container(s) is about 99% or less (e.g., about 95% or less, or about 90% or less, or about 85% or less) of the volume of the annular space. Preferably, the volume of the container(s) before altering the container(s) is about 70% or more (e.g., about 80% or more, or about 85% or more) of the volume of the annular space. The volume of the container(s) is typically chosen based on the configuration of the container(s) and on the degree to which the compressible material will remain compressed after alteration of the container(s).

The difference between the first volume of the compressible material under restraint and the unrestrained volume of the compressible material is representative of the amount of compression the compressible material is subjected to when enclosed within the container(s). Typically, the first volume of the compressible material under restraint is about 80% or less (e.g., about 70% or less, or about 60% or less, or even about 50% or less) of the unrestrained volume of the compressible material.

After altering the container(s) to reduce the level of restraint on the compressible material, the compressible material desirably substantially fills the annular space. As noted above, advantageously the compressible material will expand within the annular space and will fill any voids within the annular space, thus providing a substantially uniform distribution of the compressible material within the annular space.

In one embodiment, the compressible material, after altering the container(s), has substantially the unrestrained volume of the compressible material, which volume is substantially the volume of the annular space.

In another embodiment, the compressible material, after altering the container(s), has an unrestrained volume that is about 1% or more, preferably about 10% or more (e.g., about 20% or more, or about 30% or more) greater than the volume of the annular space. In other words, the second volume of the compressible material in the annular space after altering the container(s) is at least about 9% (e.g., at least about 17%, or at least about 23%) less than the unrestrained volume of the compressible material. That is, the compressible material desirably would overfill the annular space after altering the container(s) if not for the restraint on the compressible material by the inner and outer pipes. The overfilling of the annular space with the compressible material is desirable because of the improvement in the insulating characteristics of the pipe-in-pipe assembly resulting from the filling of voids within the annular space with the compressible material and the continuing compression to some extent of the compressible material after altering the container(s) which can improve insulation performance. The residual force associated with the overfilling of the annular space assists in migrating or moving the compressible material into voids within the annular space and thus improves the uniformity of distribution of the compressible material within the annular space. Further, as described below, the residual force advantageously permits the use of the compressed material to obtain mechanical benefits as a means of transferring longitudinal and/or radical force(s) between the inner pipe(s) and the outer pipe. In particular, this residual force creates a level of friction between the inner pipe(s) and compressible material, and/or the outer pipe and the compressible material, so as to help prevent unwanted movement of the pipes within of the pipe-in-pipe assembly. Suitable porous, resilient, volumetrically compressible insulative material and especially the preferred compressible material such as aerogel, more particularly, Nanogel® aerogel (available from Cabot Corporation, Boston, Mass.) has spring like properties and consequently there can be residual force in the material that acts on both the inner and outer pipes, especially where the unrestrained material substantially fills (or even overfills) the annular space. This residual force is similar to the force a spring exerts when under compression, except in the case of the material the force may be bi- or tri- or even omni-directional instead of uni-directional. This residual force enables the insulation material to form a mechanical "bond" (through friction) between the inner pipe(s) and an outer pipe or between outer pipe(s). The strength of this bond will depend upon the amount of material in the annular space, the nature of the material and the pipe material. In other words, the higher the percentage of annular space filled with the compressed material, the greater the packing of the unrestrained material and consequently, the stronger the "bond". This "bond", in turn, transfers longitudinal and/or radial stresses that the pipe-in-pipe assembly faces in both installation (e.g., bending around a reel in a so called "reel-lay" case, bending as the assembly lays on the ocean floor in a so called "J-lay" case, bending off the back of the lay barge in a so called "S-lay" case) as well as in service (e.g., expansion and contraction of the inner pipe during heat up and cool down cycles). In the absence of a "bonded" insulation system such as this, the longitudinal stresses are typically handled by bulkheads which hold the inner and outer pipes together and the radial stresses are sometimes handled by centralizers (also known as spacers), which keep the pipes more or less concentrically aligned. Thus an advantage of the invention is that the insulation material itself aids in stress transfer, which allows the pipe-in-pipe design to use thinner and/or fewer bulkheads and/or spacers. As bulkheads and spacers are generally made of materials that are significantly weaker insulators when compared with the insulation properties of the invention, reducing the number and/or width of these bulkheads and spacers over the length of the system will improve thermal performance while lowering cost and complexity. The levels of stress transfer are low when compared to other materials (e.g., metals, composites) typically used in bulkhead and spacer construction. However, since the insulation material completely fills all the annular space in this embodiment, the force transfer can be shared across the entire surface area of the pipe, rather than in relatively narrow slivers spaced relatively widely apart. The use of polyurethane foam in pipe-in-pipe systems is commonly known by those practiced in the art. Some polyurethane foam pipe-in-pipe systems adhesively bond the inner and outer pipes to allow for load transfer. While this method can be acceptable, once excessive force breaks the adhesive bond, the value of longitudinal load transfer (and, potentially, radial load transfer) is lost. The present invention, by using a mechanical and not a adhesive bond and by its "spring back" nature, will spring back to its original form even after experiencing the type of compression that would destroy the adhesive bonds of a polyurethane foam system, and consequently continue to mechanically bond the system. Thus an embodiment of the invention is an insulated pipe-in-pipe system, comprising an inner pipe, an outer pipe and insulation therebetween, wherein the insulation provides one or more of longitudinal or radial load transfer between the inner pipe and the outer pipe, and wherein the insulation is not adhesively bonded to the inner pipe or the outer pipe.

In a preferred embodiment, (a) the first volume of the compressible material in the container(s) is about 70% or less of the volume of the unrestrained volume of the compressible material, (b) the first volume of the compressible material in the container(s) is less than the volume of the annular space (e.g., about 99% or less, or about 95% or less), and (c) the second volume of the compressible material in the annular space after altering the container(s) is greater than or equal to about 1%, (preferably 10%-33%) less than the unrestrained volume of the compressible material.

Typically, when a pipe-in-pipe assembly is placed into operation and when a fluid (e.g., a liquid or a gas) is flowed through the inner pipe(s), wherein the fluid is at a different temperature than the temperature to which the outer pipe is subject, the inner pipe(s) expands or contracts relative to the outer pipe due to the temperature differential applied to the inner pipe(s) vis a vis the outer pipe, depending on whether the temperature of the fluid is higher or lower than the external temperature. This differential expansion of the inner pipe(s) and the outer pipe produces longitudinal forces between the pipes. When the inner pipe(s) and the outer pipe are joined together, for example, by connecting means, welding or bulkheads, the stresses (e.g., longitudinal forces) generated by the differential expansion or contraction of the inner pipe(s) relative to the outer pipe are concentrated at the points of junction (e.g., at the connecting means, welds or bulkheads) or at weak points in a pipe, and will result in deformation of the structure, manifested in a curvature being generated in the structure, or rupture of the pipe. Advantageously, the compressible material, when under compression due to overfilling of the annular space, provides a means of transferring longitudinal forces between the inner pipe(s) and outer pipe, thereby reducing the stress placed on the connecting means or welds between the pipes and also accommodating "kinking" (e.g., deviation from linearity) of the assembly by transferring radial forces. Desirably, the compressed compressible material provides the primary means of transferring the longitudinal forces between the inner and outer pipes by allowing for coupling of the motion of the outer pipe and the inner pipe(s) relative to each other. In addition to the amelioration of stresses caused by differential expansion or contraction of the inner and outer pipes, advantageously the handling of the pipe-in-pipe assemblies is simplified by at least partial reduction of the need to simultaneously secure both inner pipe(s) and outer pipe to avoid unwanted slipping of the inner pipe(s) and outer pipe with respect to each other, for example, when moving the assembly (e.g., placing the assembly into operation).

The container(s) can have any suitable shape. For example, the container(s) can have a roughly rectangular parallelepiped geometry (e.g., a brick shape). The container(s) also can have a spherical or cylindrical shape. In a preferred embodiment, the container(s) have an elongate arched shape. It will be understood that an elongate arched shape comprises a curve having generally a circular geometry defined by a cross section of the elongate arched container, wherein the angle defined by the two ends of the arch and the central point of the thus-defined semi-circle can be any nonzero value between zero and, at the limit, 360 degrees (e.g. a circular elongate arched container is also contemplated). Thus, in one embodiment, the arch of the elongate arched container comprises an angle as hereinbefore defined of 180 degrees (e.g., a "half shell"). In another embodiment, the arch of the elongate arched container comprises an angle of less than 360 degrees (e.g., about 355 degrees or less), in which the elongate arched container generally comprises a "C" shape, wherein the container has non-contiguous elongate edges that define a gap therebetween.

The container(s) can also have shaped elongate edges to facilitate "mating" of the edges. For example, a pair of elongate mating edges can have complementary shapes so that the mating geometry can be any suitable mating geometry, including simple parallel faces. The mating edges can have a "tongue-in-groove" configuration and variations thereof. Other suitable geometries will be readily apparent to the ordinarily skilled artisan.

Figure 1:
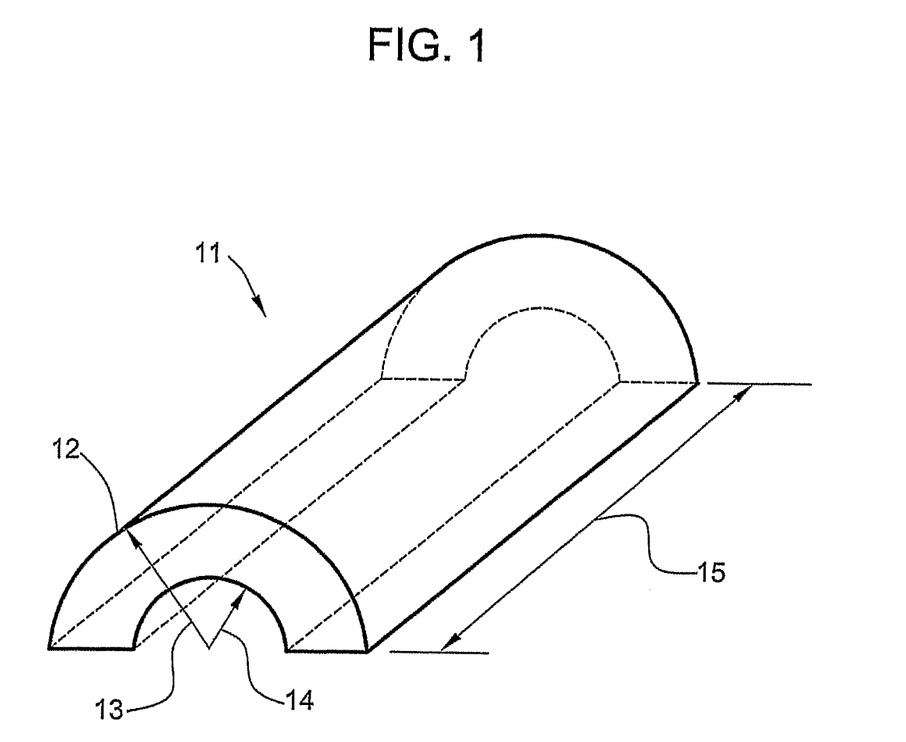
FIG. 1 illustrates one embodiment of a sealed container useful in the context of the invention.

FIG. 1 illustrates an embodiment of a container having an elongate arched shape. The container can be characterized by a container 11, comprising a flexible material 12, with an outer radius 13, inner radius 14, and length 15.

When a plurality of containers is used in the context of the invention, desirably the containers will be positioned relative to each other such that gaps defined by the edges of the containers will not be coincident and thereby provide energy transfer passages between the inner pipe(s) and the outer pipe. By way of illustration, when a plurality of elongate arched containers are employed in the context of the invention and placed end-to-end and coextensive with the exterior surface of the inner pipe, the gaps defined by the adjacent elongate edges of containers placed along one section of the inner pipe desirably are staggered with respect to the gaps defined by the adjacent elongate edges of containers placed along an adjacent section of the inner pipe. Similarly, if multiple layers of the containers are utilized in the radial direction between the inner pipe(s) and outer pipe, the edges of the container(s) of the one layer are staggered with respect to the edges of the container(s) of an adjacent layer. In this manner, any potential channels that may result from incomplete filling of the gaps with the compressible material after altering the containers desirably would not extend for more than the length of any one container in any direction within the annular space.

The porous, resilient, volumetrically compressible material can be any suitable such material. The compressible material desirably comprises pores. The pores can be any suitable size and desirably are open. Preferably, the pores will have an average pore size (e.g., average pore diameter) of about 25 microns or less (e.g., about 15 microns or less, or about 10 microns or less, or even about 1 micron or less). By resilient it is meant that the compressible material will have an elastic compressibility, wherein application of a pressure to a bulk amount of the compressible material will result in a reduction of the volume occupied by the compressible material, and wherein after release of the pressure the volume of the compressible material will increase and desirably return to substantially the same value as before application of the pressure.

The compressible material can comprise porous particles, wherein the porous particles are resilient and volumetrically compressible, and can comprise any amount of porous particles as a fraction of the total amount of compressible material. In one embodiment, the compressible material will substantially comprise no porous particles. In other embodiments, the compressible material will comprise at least some porous particles (e.g., about 5% or more) and can consist essentially of, or even consist of, porous particles (e.g., about 100%).

The porous particles can be any suitable porous particles. Suitable porous particles include nanoporous particles, especially nanoporous silica particles. Nanoporous silica particles desirably have a pore size (e.g., average pore diameter) of about 1 nm to about 100 nm. The pore size is determined by methods well-known in the art, such as mercury intrusion porosimetry, or microscopy. Non-limiting examples of nanoporous silica particles include silica aerogels made by a sol-gel process, nanoporous silica made by a co-fuming process, and nanoporous silica made by co-fuming silica with carbon black followed by pyrolysis of the carbon. Preferably, the nanoporous silica particles are hydrophobic. Nanoporous silica particles can be rendered hydrophobic by any suitable process, many of which are well known in the art.

Desirably the porous particles are aerogel particles. Aerogels are characterized as gels having air (e.g., a gas) as a dispersion medium. Examples of suitable aerogels include silica aerogels and organic aerogels, with silica aerogels (such those available from Cabot Corporation, Boston, Mass. under the name "Nanogel®") being preferred.

The porous particles can have any suitable particle size (e.g., average particle diameter). For example, the porous particles can have an average particle size of about 1 µm to about 5 mm (e.g., about 5 µm to about 3 mm), where the particle size is defined as the diameter of the smallest sphere that encompasses the particle. The porous particles can have any suitable particle shape, (e.g., irregular, spherical, etc.).

The compressible material can comprise a non-particulate material, so long as the compressible material as a whole is resilient, volumetrically compressible and optionally porous. Non-limiting examples of non-particulate resilient, volumetrically compressible material include foams, materials comprising fibers, and composites thereof. Non-limiting examples of compressible materials comprising fibers include composite materials comprising fibers and aerogels (e.g., fiber-reinforced aerogels) and, optionally, at least one binder. The fibers can have any suitable structure. For example, the fibers can have no structure (e.g., unassociated fibers). The fibers can have a matrix structure or similar mat-like structure which can be patterned or irregular and random. Preferred composites of materials comprising fibers include composites formed from aerogels and fibers wherein the fibers have the form of a lofty fibrous structure, batting or a form resembling a steel wool pad. The lofty fibrous structure is characterized in that upon application of a pressure, the volume of the lofty fibrous structure will be reduced, and upon removal of the pressure, the lofty fibrous structure will rebound to a volume at least greater than the volume when under pressure and desirably to the initial unrestrained volume. Examples of materials suitable for use in the preparation of the lofty fibrous structure include fiberglass, organic polymeric fibers, silica fibers, quartz fibers, organic resin-based fibers, carbon fibers, and the like. Although the material having a lofty fibrous structure is suitable for use in the inventive method by itself, preferably the material having a lofty fibrous structure further comprises a second, open-cell material. A preferred example of an open-cell material for use in the inventive method is an aerogel. When a second, open-cell material (e.g., a silica aerogel) is used with a material having a lofty fibrous structure, the resulting composite material desirably is compressible and resilient. However, when used in conjunction with compressible porous particles, the requirements for compressibility and resiliency of the non-particulate compressible material are diminished, as long as the combination is compressible and resilient.

A preferred non-particulate porous, resilient, volumetrically compressible material comprises a blanket comprising a material having a lofty fibrous structure and a silica aerogel dispersed within.

The compressible material can further comprise an opacifier. The function of an opacifier is to prevent or minimize infrared transmission of thermal energy between the inner pipe and the outer pipe by absorption of the infrared waves. Non-limiting examples of suitable opacifiers include carbon black, titanium dioxide, zirconium silicate, and mixtures thereof. While any appropriate loading of opacifier may be used, preferred loadings for the opacifier are between 1 vol. % and 50 vol. %).

As noted above, in the first method embodiment of the invention, the container(s) is (are) sealed and comprise(d) of air-impermeable material. The air-impermeable material can be any suitable air-impermeable material. Generally, the air-impermeable material is chosen to have sufficient air-impermeability to maintain a reduced air pressure for at least several months (e.g., at least 3 months) and to possess sufficient mechanical durability to allow for handling without accidental breaching as may occur, for example, during shipping and handling, or during installation within the pipe-in-pipe assembly. The air-impermeable material desirably is flexible. In one embodiment, the air-impermeable material is flexible but substantially non-elastic. In other embodiments, the air-impermeable material can be elastic to allow for expansion of the compressible material while maintaining its integrity. Preferably, the air-impermeable material comprises a film comprising a metal, a polymer or copolymer (e.g., coextruded nylon polyethylene), a fabric, and combinations thereof.

In the second method embodiment of the invention, the requirements for the container(s) can be the same as for the first method embodiment with the exception that the container(s) is (are) not required to be air-impermeable. In this embodiment, the container may be compressed mechanically.

The container(s) has (have) no particular restrictions on configuration of the air-impermeable material. The material comprising the container(s) is dimensioned so as to fully enclose the compressible material under restraint, i.e., at its first volume. The material comprising the container(s) can be dimensioned so as to fully enclose the compressible material at its second volume or even at its unrestrained volume. After compression of the compressible material, the excess material can simply drape the container(s) in a random manner. The material can be provided with pleats, or folds, so that upon compression of the container(s), the material folds down to allow for a smoother outer surface than otherwise attainable without pleats or folds.

The container(s) can be partially or completely encircled or enclosed within a sleeve. The functions of the sleeve include but are not limited to aiding in the positioning of the container(s), protecting the container(s) from mechanical damage during practice of the inventive method, providing additional insulating properties to the pipe-in-pipe assembly, and the like. The sleeve can be made of any suitable material. Non-limiting samples of sleeve materials include aluminum, steel, galvanized steel, stainless steel, elastomers (including, silicones), thermoset polymers (including epoxies and resins), thermoplastic polymers (including polyethylene, acrylic, polycarbonate, polypropylene, polyamide, polyvinylchloride, polystyrene), polymer foams (including polyurethane foam), and composites (including carbon fiber-reinforced polymers, fiber glass). In certain embodiments the sleeve comprises an elastic material so as to accommodate the expansion of the container(s) after alteration without damage to the sleeve. The sleeve can also be enclosed by the container(s). In such an embodiment, the sleeve is placed around the compressible material prior to placement of the material comprising the container around the sleeve. Thus the invention includes embodiments wherein the pipe in pipe assembly comprises at least one inner pipe with an exterior surface; an outer pipe with an interior surface that is disposed around the at least one inner pipe; an annular space between the interior surface of the outer pipe and the exterior surface of the at least one inner pipe; and at least one container containing compressed porous, resilient, compressible material, said container being disposed in the annular space and wherein the container is partially or completely enclosed within a sleeve. In an alternative to the above described embodiment, a sleeve may be placed between the container and the compressible material.

Figure 6:
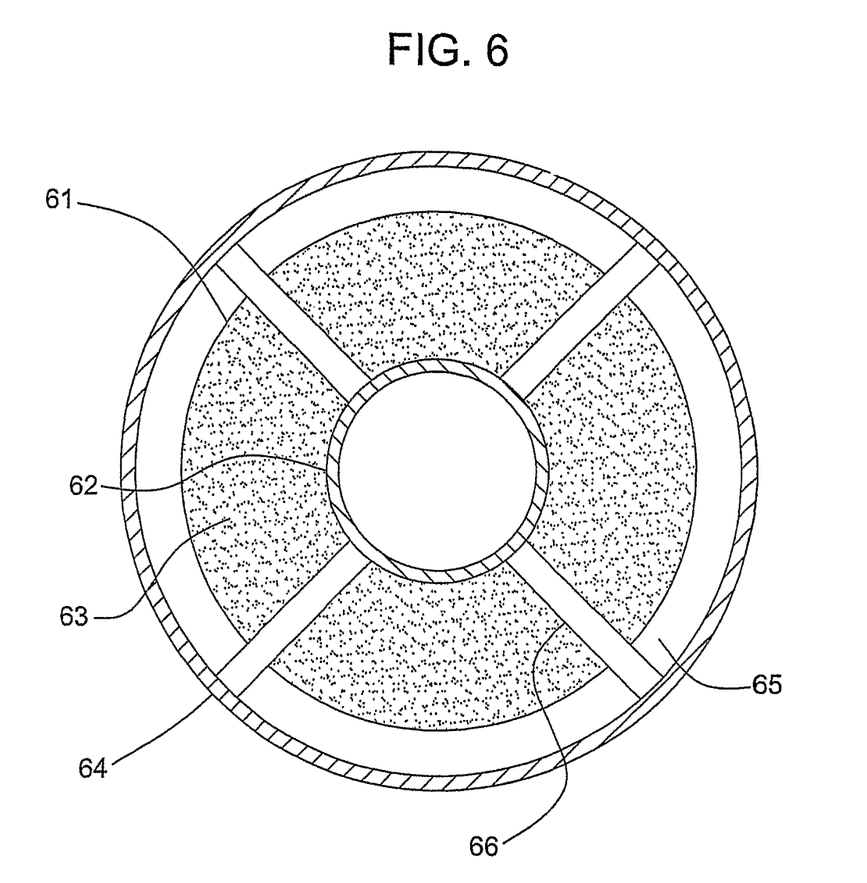
FIG. 6 illustrates a pipe in pipe assembly whereby a sleeve or sheath is used to constrain the porous, resilient and volumetrically compressible material such that a void space exists between the sleeve and the outer pipe.

In another embodiment, illustrated in FIG. 6, the sleeve (or sheath) 61 functions as a restraint on the expansion of the compressed material 21, even upon alteration of a container. In this insulated assembly, it is preferred that there is a void in the annular space 31 between the exterior surface of sleeve 61 and the inner surface of the outer pipe 33. This annular void 31 may be filled with a gas, such as air. The void space may be maintained through the use of bulkheads, or spacers (of various forms) 62. The presence of the void space allows the inner and outer pipes to move independently of each other, which may be advantageous in certain deployment methods or operating conditions.

The container(s) can be provided with a heat shield(s). The function of the heat shield(s) is to protect the container(s) from heat generated by any welding process that may be employed during practice of the inventive method. The heat shield(s) can be the same as the sleeve, or the heat shield(s) can be separate and distinct from the sleeve. The heat shield(s) can be made of any suitable material, for example, a metal or a thermally stable polymer. In some embodiments, the heat shield(s) is (are) separate from the container. In such embodiments, the heat shield(s) can be free-floating, or the heat shield(s) can be attached to the inner surface of the outer pipe or the outer surface of the inner pipe(s) of the pipe-in-pipe assembly, by any suitable means, such as by way of suitable fasteners or welding. Non-limiting examples of fasteners include adhesive compositions, adhesive tapes, hook-and-eyelet assemblies, and hook-and-loop fasteners.

The container(s) can optionally have a coating comprising a lubricating agent. The lubricating agent serves to facilitate assembly of the pipe-in-pipe apparatus, e.g., by facilitating the positioning of the container(s) within the annular space.

In the first method embodiment of the invention, and optionally in the second method embodiment of the invention, the container(s) is (are) sealed, and the sealed container(s) is (are) provided with a reduced pressure therein. The reduced pressure can be any pressure that is less than atmospheric pressure. Typically, the reduced pressure is about 1 kPa or more (e.g., about 10 kPa or more, or about 20 kPa or more). Preferably, the reduced pressure is about 100 kPa or less (e.g., about 75 kPa or less, or about 50 kPa or less).

Figure 2:
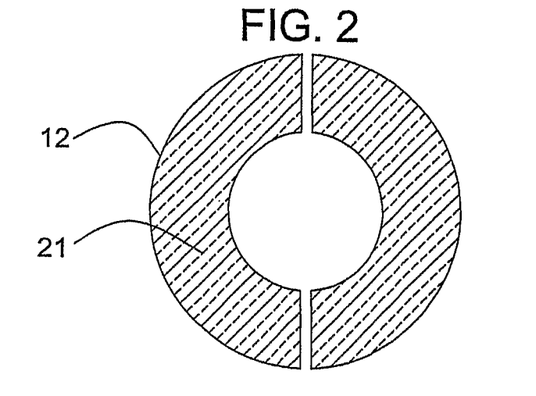
FIG. 2 illustrates a cross-sectional view of two sealed containers of the embodiment of FIG. 1 positioned so as to encircle an inner tubular member.
Figure 3:
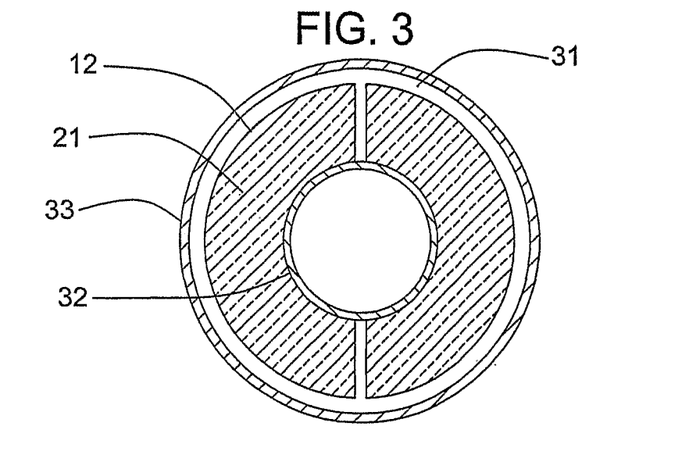
FIG. 3 illustrates a pipe-in-pipe assembly having an inner pipe 5, an outer pipe 6, and two sealed containers of the embodiment of FIG. 1 comprising a porous, resilient, and volumetrically compressible material placed within the annular space defined by an inner pipe and an outer pipe.
Figure 4:
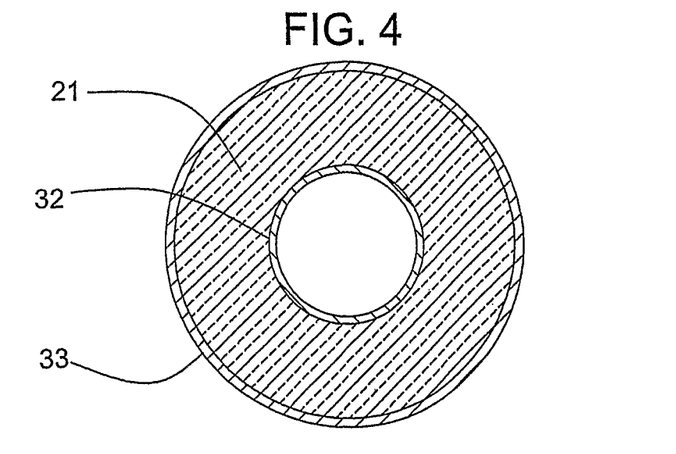
FIG. 4 illustrates the pipe-in-pipe assembly of FIG. 3 after pressure-equalization of the two sealed containers.

The invention is further illustrated by FIGS. 2, 3, and 4. FIG. 2 illustrates an embodiment comprising two semicircular "half-shell" containers comprising a flexible material 12 surrounding porous, resilient, volumetrically compressible material 21. Positioned within a pipe-in-pipe apparatus as illustrated in FIG. 3, containers comprising compressible material 21, enclosed within container material 12, are positioned coextensively within the annular space 31 defined by inner pipe 32 and surrounded by outer pipe 33. The container may fill up to one-hundred percent of the annular space. After alteration of the containers, as illustrated in FIG. 4, the compressible material 21 expands to the extent possible so as to substantially fill the annular space defined by inner pipe 32 and outer pipe 33.

Figure 5:
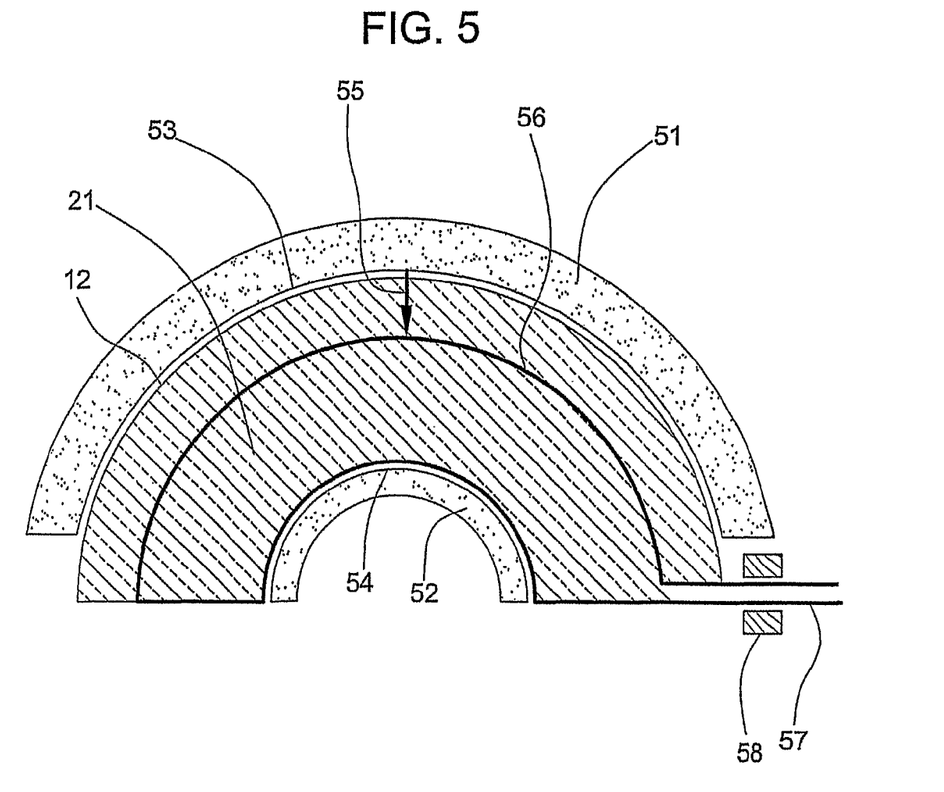
FIG. 5 is a schematic cross-sectional view of a mold apparatus at the beginning and end of a process of forming a sealed container useful in the context of the invention.

The container(s) can be prepared by any suitable process. One particularly suitable process for preparing the elongate arched container embodiment depicted in FIG. 1 as a sealed container is illustrated by reference to FIG. 5. FIG. 5 schematically illustrates a cross-sectional view of a mold apparatus for forming a container comprising nanoporous silica particles. The mold apparatus comprises upper mold member 51 and lower mold member 52. As shown in FIG. 5, an unsealed container of an air-impermeable flexible material 12 with compressible material 21 therein is placed in contact with one surface 53 of the outer mold member 51 and one surface 54 of the inner mold member 52. The outer mold member is moved distance 55 so that surface 53 moves to position 56, while a vacuum is applied through a fluid connection 57. A sealing means 58 is then applied to fluid connection 57, and fluid connection 57 is sealed, either by leaving sealing means 58 in place, or by sealing the end of fluid connection 57 beyond sealing means 58, followed by removal of sealing means 58, to produce the elongate arched sealed container 11. In similar embodiments, outer mold member 51 may be held stationary while inner mold member 52 can be moved to a position closer to outer mold member 51, or both outer mold member 51 and inner mold member 52 can be moved simultaneously towards each other. Alternatively, neither inner mold member 52 nor outer mold member 51 are moved.

Other variations of the above process are described below. These processes and the above process may all be practiced in-situ during the pipe-in-pipe assembly process.

a. Suction vacuum packing in a flexible container with mold using single or multiple point suction. An airtight container is placed in a mold and connected to a vacuum pump and the pressure inside the container reduced. Once the pressure inside at the container is at the desired level, the container is sealed and the connection removed. The pressure differential between the outside and the inside of the container compresses the material which is shaped by the mold.
b. Compression of a flexible container inside a rigid mold. A container filled with particles is placed in a mold with rigid, but movable boundaries. The container is compressed using gas, liquid or other suitable compression means, into a desired shape and the container sealed airtight. The container is then removed from the mechanical compression mold.
c. Compression of a flexible container with flexible mold (e.g. a bladder). A container filled with particles is placed in a mold with flexible boundaries. The container with particles is compressed into a desired shape by applying a pressure on the flexible boundaries. Gas, liquid or other suitable compression means may be used to apply pressure to the container. When the desired shape of the container has been produced, the container is sealed and removed from the mold.
d. Compression of flexible container with rigid and flexible mold. Mechanical compression of containers using a combination of processes (b) and (c) using a mold that has both movable rigid boundaries a flexible boundaries.
e. Rigid mold compression of flexible container after vacuum packing. A compressed container is produced via vacuum as described herein, then a rigid mold is used for a compression of the container into a desired shape.
f. Flexible compression of flexible container after vacuum packing. A compressed container is produced via vacuum as described herein, then a flexible boundary mold (e.g. mold with bladders) is used to apply pressure to compress the container into the final shape.
g. Rigid and/or flexible mold mechanical compression of flexible container concurrent with vacuum packing. A compressed container is produced using a vacuum as described herein, while simultaneously applying mechanical compression as outlined in process (b), (c) or (d) above.
h. In another embodiment, the container(s) can be compressed and/or shaped by passage of the container(s) through a system of driven rollers that compress the container(s) to desired dimensions. In the simplest case, the container(s) has a rectangular parallelepiped geometry (e.g., a brick shape). The container(s) is then passed between two parallel cylindrical rollers having a gap therebetween, wherein the gap is smaller than the thickness of the container(s), thereby compressing the container(s) to the desired thickness. The container(s) can be at atmospheric pressure or at a reduced pressure. Alternatively, the pressure within the container(s) can be reduced as the container(s) is passed between the rollers, so that after passage of the container(s) between the rollers, the container(s) is at a reduced pressure. In other embodiments, multiple rollers can be configured to produce a shape in the container(s). For example, three pairs of rollers placed end-to-end and having an angle between adjacent pairs of rollers of 60° can be used to shape the container(s) in a roughly semicircular shape. Other embodiments will be readily apparent to the skilled artisan.
i. High pressure chamber installation. A compressed container is produced using vacuum processes described herein, (a) or (b), then containers are placed in a chamber where the pressure is then maintained above atmospheric pressure. The additional pressure will increase the level of compression of the packs.
j. Compression of semi-rigid container. This method does not require a mold. A rigid container is filled with compressible material and a mechanical press is used to press the container into the desired shape. Once the container is in the desired shape a mechanical restraint or airtight seal is applied to lock the container into that shape.
k. External air pressure compression of a semi-rigid container. The container is filled with compressible material and the container is placed in a chamber vacuum. Once the chamber has been evacuated, the container is sealed with an airtight seal and the pressure in the chamber is raised to atmospheric. The pressure differential between in the inside and the outside of the container is used to compress the container. Alternatively, the filled container is connected to a vacuum, and the pressure in the container is reduced. Once the pressure is at the desired level the suction port is sealed.

When the container(s) is (are) non-sealed (i.e., not airtight), the container can be prepared by any suitable method. Numerous methods for compression filling containers with a compressible material are well known in the art. In one embodiment, the process recited herein for preparing an elongate arched sealed container can be adapted for preparing the (non)sealed container by eliminating the application of the vacuum and by including at least one surrounding sheath or belt which is secured in the compressed position to retain the compressible material in a compressed state.

The alteration of the container(s) can be accomplished by any suitable technique. In one embodiment, the container(s) is (are) sealed and has a valve or a closed port that, when opened, allows for the introduction of a gas into the container(s) to equalize the pressure within the sealed container(s) with the pressure within the annular space, while otherwise maintaining the integrity of the sealed container(s).

In another embodiment, the container(s) is (are) sealed and is (are) breached so as to destroy the integrity of at least a part of the sealed container(s). Any suitable method can be employed to breach the container(s). Breaching of the container(s) can be accomplished by heating of the container(s). The container(s) can be heated to a temperature sufficient to induce a phase transition in the material comprising the container(s) (e.g., melting transition or glass transition) or to induce decomposition of the material comprising the container(s). The heating can be accomplished using any suitable means. For example, the container(s) can be heated as a result of a welding operation carried out on the inner or outer pipe(s) of the pipe-in-pipe assembly. Alternatively, or in addition, heat can be applied to the inner or outer pipe(s) of the pipe-in-pipe assembly independently of any welding operation and can be selectively applied to any suitable section of the inner or outer pipe(s) to induce breaching of the container(s) at any preselected place or places along the pipe-in-pipe assembly.

Heating of the container(s) can be accomplished by use of a laser beam having any suitable fixed frequency or having a frequency that is varied in a predetermined manner. The laser beam can impinge directly on at least a portion of a surface of the container(s) to heat at least a portion of the container(s) and cause breaching of the container(s). When the pipe-in-pipe assembly comprises a plurality of (e.g., two or more) containers, the laser beam can be moved across at least a portion of a surface of each container. Alternatively, the laser beam can be used to cause local heating of at least a portion of one of the surfaces defining the annulus wherein the heated surface subsequently heats the container(s). The laser source can be maintained outside of the annulus or can be placed within or moved through the annulus.

The surface of the container(s) can be heated directly to cause breaching of the container(s). An assembly comprising a guide rod or guide line having a heating member slidably connected thereto, which heating member comprises heating means, can be introduced into the annulus of the pipe-in-pipe apparatus. Examples of suitable heating means include but are not limited to electrically resistive heating elements, open flames, and means for delivering hot gases to the surface of the container(s). In use, the heating member can be moved along the guide rod through the annulus from one end to the other while contacting the surface of the container(s) to cause breaching thereof. The guide rod and heating member optionally then can be removed from the annulus for use in other assemblies. The heating member can be moved at a constant or variable rate through the annulus. The heating member can be fixed to a rod or bar and moved through the annulus manually or mechanically to effect breaching of the container (s). Alternatively, the heating member can be configured to have the same or substantially the same length as the pipe-in-pipe assembly so as to provide heat simultaneously throughout the annulus. An example of such an embodiment is a heated pipe, wherein the pipe is heated by means of a hot fluid contained therein. The hot fluid can be introduced into the pipe before use, or can be circulated through the pipe by means of a pump. The heated pipe can be the inner pipe(s) itself, wherein a hot fluid is pumped through the inner pipe(s) to heat the entire pipe-in-pipe assembly to a sufficient temperature and a sufficient length of time to cause breaching of the container(s).

Heating of the container(s) can be accomplished by means of ultrasonic heating. An ultrasonic heating apparatus can be introduced into the annulus and used to heat at least a portion of the container(s) to effect breaching thereof. When the outer and/or inner pipe comprises a metal, induction heating of the metal pipe(s) can be used to heat the container(s) and effect the breaching thereof.

The container(s) can be fabricated with an electrically resistive element attached to the outer or inner surface thereof or incorporated into material comprising the container(s). The electrically resistive element can comprise a wire, a plate, or similar configuration. On passage of an electrical current through the electrically resistive element, the element will generate heat which leads to breaching of the container(s). When the electrically resistive element is a wire, the wire can be configured on a surface of the container(s) to breach the container(s) in a predetermined pattern. For example, the wire can be wrapped around the container(s) in a helical manner to ensure breaching of the container(s) in a uniform manner about the external surface thereof.

In addition to local heating of the container(s), breaching of the container(s) can be accomplished by raising the temperature within the annulus and maintaining an elevated temperature for an appropriate length of time to ensure satisfactory breaching of the container(s). For example, a flow of hot gas can be passed through the annulus to soften, melt, or otherwise degrade the container(s).

Breaching of the container(s) can be accomplished by use of mechanical means. For example, a cutting assembly comprising at least one sharp edge can be positioned within and optionally moved through the annulus of the pipe-in-pipe assembly so that the at least one sharp edge tears or cuts the container(s) to accomplish breaching. The at least one sharp edge can be a knife, a pin or spike, a saw blade a string or wire with sharp materials (such as broken glass) affixed thereto or any combination of the above. The cutting assembly can be slidably connected to a guide rod or guide wire, wherein the guide rod or wire is placed within the annulus followed by movement of the cutting assembly along the guide rod or wire to breach the container(s) therein. The cutting assembly also can be affixed to a guide rod, and breaching can be accomplished by moving the cutting assembly and the guide rod through the annulus.

The container(s) can comprise means for guiding a heating assembly or cutting assembly through the annulus close to a surface of the container(s) to ensure breaching of the container(s). For example, the container(s) can have a guide tube or ferrule attached to a surface thereof into which a guide rod can be inserted. A heating or cutting assembly can then be slidably moved along the guide rod to effect breaching of the container(s). When a heating assembly is employed for breaching, the guide tube can comprise a thermally conductive material (e.g., a metal) to facilitate transfer of heat from the heating assembly to a surface of the container(s).

The container(s) can be mechanically breached by compression upon bending of the assembled pipe-in-pipe assembly. The pipe-in-pipe assemblies described herein can be joined end-to-end to form a pipeline. In practice, assembled pipelines are often taken up on spools to allow for transportation of long pipelines on pipeline-laying ships. The process of spooling requires bending of the pipelines and individual segments thereof. The bending can result in compression of the container(s) between outer and inner pipes so as to breach the container(s).

When the container(s) is (are) sealed to be gas-impermeable and is (are) at a reduced gas pressure that is less than atmospheric pressure, the container(s) can be breached before installation in a manner such that the expansion of the container(s) occurs on a time scale that allows for completion of the pipe-in-pipe assembly before the container(s) is (are) fully expanded. For example, small diameter holes can be introduced into the container(s) prior to completing the pipe-in-pipe assembly. Alternatively, means for breaching such as a valve or otherwise sealed opening can be incorporated into the container(s) itself (themselves), which valve or opening is designed to admit gas into the container(s) at a controlled rate so as to allow sufficient time for completion of the pipe-in-pipe assembly before full expansion of the container(s) occurs.

The container(s) can be breached using chemical means. One method comprises use of a device which releases a solvent or chemical agent that dissolves or reacts with the material comprising the container(s) to degrade the integrity of the container(s), thereby causing a breach of the container (s). The device can be affixed to the surface of the container by adhesive or other suitable means, and can be affixed before, during, or after assembly of the pipe-in-pipe apparatus. The device also can contain a reactant that reacts exothermically with the material comprising the container(s), or a mixture of reactants that react with the material of the container(s) and/or with each other, thereby supplying localized heating to the surface of the container(s) and thus effect breaching thereof. The device can contain an explosive material (e.g., a blasting cap or similar device) so that, when detonated, the resulting shock wave mechanically disrupts the container(s) and leads to breaching thereof. The device can comprise an ignitable cord, such as a fuse, which cord can be affixed to the interior or the exterior surface of the container(s). Upon ignition, the ignitable cord will burn through the surface of the container (s) and breach the same.

In yet other embodiments, the container(s) is (are) not sealed. Alteration of the (non-sealed) container(s) can be performed as previously recited herein for the sealed container(s) with the exception of any requirement to introduce a gas to equalize pressure in the sealed container(s), and further includes alteration of any restraining means to reduce the level of restraint on the compressible material. Alteration of restraining means can be the same as previously recited herein for breaching of sealed container(s), and the adaptation of the breaching methods to the alteration of the restraining means will be readily apparent to the ordinarily skilled artisan.

The inventive method optionally further includes additional steps. One optional additional step comprises verifying the alteration of the container(s) and/or restraining means. Suitable methods for verifying the alteration of the container(s) and/or restraining means include but are not limited to visual methods, ultrasound imaging techniques, and X-ray imaging. Verification methods can be practiced during alteration of the container(s) and/or restraining means to ensure proper alteration, or can be practiced after alteration.

Another optional additional step comprises positioning additional insulation material in the annulus prior to alteration of the container(s). The additional insulating material can be any suitable insulating material and can comprise one or more insulating materials that can be the same or different. Typically, the additional insulating material comprises a compressible material. Preferably, the additional insulating material can comprise one or more blankets comprising a nonparticulate porous, resilient, volumetrically compressible material.

The additional insulating material can comprise a metallic or metallized film. The metallic or metallized film serves to reduce transmission of energy between the inner pipe(s) and the outer pipe through radiation. The metallic or metallized film can be any suitable such film. Examples of suitable metallic or metallized films include aluminum foil, aluminum-coated substrates including polymer films, fabrics, and the like. The metallic or metallized film can be a separate film, can be incorporated into an insulating blanket, or can be incorporated into the container(s) wherein the metallic or metallized film can reside on the exterior surface or the interior surface or the container(s). The metallic or metallized film can be fastened to any surface within the annulus using any suitable fastener as previously recited herein, or can be placed without any fastener (e.g., by wrapping any surface). The material comprising the container(s), of course, can be a metallic or metallized film as well.

In addition to comprising a metallic or metallized film, the additional insulating material can comprise any suitable film. Non-limiting examples of suitable films include polymeric and/or woven films or fabrics. In this regard "film" refers to a thin sheet of insulating material (e.g., films formed of high density polyethylene fibers such as TYVEK® material), which sheet can have any suitable configuration and which can comprise one or more layers of the same or different material. The film also can comprise a composite comprising a permeable membrane sandwiched between an inner and outer layer (e.g., GORE-TEX® material or other polytetrafluoroethylene material). The film can be fastened or incorporated into the pipe-in-pipe apparatus in any suitable manner, e.g., as previously recited herein for the metallic or metallized film.

The additional insulating material can be positioned to fit between the interior surface of the outer pipe and the container(s) or between the exterior surface of the inner pipe(s) and the container(s). The additional insulating material desirable is arranged so that any edges are staggered with respect to the edges of the container(s) so as not to provide energy transfer passages between the inner pipe(s) and the outer pipe. Additional insulating material can be incorporated into the container or the container can be made out of the insulating material.

The inner pipe(s) can be disposed in any suitable manner within the outer pipe, and both the inner pipe(s) and the outer pipe can have any suitable cross-sectional shape. For example, the inner pipe(s) and outer pipe can both be circular in cross-section. If the pipe-in-pipe apparatus comprises a single inner pipe, the inner pipe can be disposed concentrically within the outer pipe, asymmetrically disposed within the inner pipe, or free to assume any disposition within the inner pipe. If the pipe-in-pipe apparatus comprises a plurality of inner pipes, the inner pipes similarly can be placed within the outer pipe in any suitable position. Wires and cables may also be disposed within the outer pipe.

In some embodiments the outer pipe may be constructed and/or placed directly on the container containing the compressible material that has been affixed to the inner pipe(s). In these embodiments, the gap between the container containing the compressible material and the outer pipe can be eliminated (such that there is direct contact between the interior surface of the outer pipe and the container of compressible material) or nearly eliminated. This allows for the compressible material to be at a higher compression level even after the container is altered (e.g., seal is breached). In some cases, having the material at a higher compression level is desirable either because it may allow for improved thermal and/or mechanical performance of the insulation layer. Moreover, the act of constructing the outer pipe may function to breach the container. The specific method of pipe construction will depend on specific material properties required of the outer pipe and non-limiting examples of construction methods include wrapping, extruding, spraying, molding, or heat shrinking the outer pipe directly on the container. Non-limiting examples of outer pipe material are elastomers (including, silicones), thermoset polymers (including epoxies), thermoplastic polymers (including polyethylene, acrylic, polycarbonate, polyproplyene, polyamide, polyvinylchloride, polystyrene), polymer foams (including polyurethane foam), and composites (including carbon fiber-reinforced polymers, and fiber glass). In one embodiment of the above, an insulated pipe in pipe assembly comprises at least one inner pipe with an exterior surface; at least one container containing compressed porous, resilient, compressible material, wherein the container is attached to the inner pipe(s) and wherein an outer pipe that has been applied over the container(s) so that the inner surface of the outer pipe and the outer surface of the container(s) are partially or completely in direct contact. The container(s) may also be partially or completely enclosed within a sleeve before the outer pipe is applied.

Additionally, although the outer pipe has been referred to herein as a single pipe, the pipe-in-pipe apparatus can comprise a plurality of outer pipes (e.g. a pipe-in-pipe-in-pipe structure). For example, the pipe-in-pipe apparatus can comprise at least one inner pipe disposed within a first outer pipe, and a second outer pipe disposed around the first outer pipe. A porous, resilient, volumetrically compressible material, or any suitable material, or no material whatsoever can be disposed in the annular space defined by the exterior surface of the first outer pipe and the interior surface of the second outer pipe. More particularly, embodiments are contemplated wherein such porous, resilient, volumetrically compressible material occupies at least one of the annular spaces between the exterior surface of the inner pipe and the interior surface of a first outer pipe; and between the exterior surface of the first outer pipe and the interior surface of the second outer pipe, and so on. Such material may or may not be restrained by a container. It is noted that in embodiments where an annular space is not occupied by the porous, resilient, volumetrically compressible material, such annular space can be filled with any suitable material (including but not limited to, uncompressed porous, resilient, volumetrically compressible material, blankets containing such material, aerogel blankets, polyurethane foam, glass beads, fibers (in woven, non-woven, loose or other forms), particulate or non-particulate materials, or even no material whatsoever.

Optionally, at least one spacer can be provided and positioned so that the spacer(s) ultimately resides in the at least one annular space. The spacer(s) function to position the inner pipe(s) within the annular space, and/or to position the outer pipes within additional annular spaces if more than one outer pipe is utilized. In an embodiment, the spacer(s) when in place will have a circular or elliptical cross-sectional shape with at least one opening to allow for the passage of the inner and/or outer pipe(s) therethrough. It should be noted that the number of spacers utilized in the insulated pipe-in-pipe assembly of the invention is or can be less than the number that would be otherwise required in a pipe-in-pipe assembly is produced using another prior art method.

The spacer(s) optionally contacts at least a portion of the exterior surface of the inner (or outer) pipe(s) and/or at least a portion of the inner surface of the at least one outer pipe. In the embodiment where the spacer(s) contacts both the exterior surface of the inner pipe(s) and the interior surface of the outer pipe, the spacer(s) can act to transmit a pressure applied to the exterior surface of the outer pipe(s) to the exterior surface of the inner (or outer) pipe(s), and thereby provide increased structural rigidity to the outer pipe(s). Such an embodiment is particularly useful when the pipe-in-pipe assembly is used in deep-sea applications.

In another embodiment, a plurality of spacers, bulkheads and/or centralizers is placed around the exterior of the container(s) and are affixed to the exterior of the container(s) by any suitable means, which embodiment advantageously allows for elimination of a separate step of providing the spacers and positioning the spacers within the annular space. The spacers also can facilitate assembly of the pipe-in-pipe apparatus by protecting the container(s) from accidental breaching, assisting in positioning of the pipes, and the like. The spacers can have any suitable configuration. For example, the spacers can be non-contiguous ribs, or fins, having an elongate dimension that is aligned longitudinally with respect to the outer pipe and the inner pipe(s). The spacers can be circular or semicircular and at least partially surround the container(s). The spacers can be made of any suitable material and can have any suitable cross-sectional geometry (e.g., round, flat, triangular, and the like). Preferably, the spacers will comprise an insulating material.

When more than one spacer is used in currently practiced pipe-in-pipe configurations, the spacers are positioned according to the requirements of the design. In reel-lay systems, for example, spacers are typically placed about 2 m apart. As described above, in one embodiment of the invention, the mechanical force provided by the insulation material allows for the use of fewer spacers than would otherwise be used today, so that the spacers can be placed at greater distances, e.g. in the reel-lay example, about 2 m (e.g., about 4 m or more, or about 6 m or more, or about 10 m or more, or even about 20 m or more) apart. In another embodiment, the pipe-in-pipe assembly can have no spacers. Because spacers generally provide a lesser degree of insulation than the compressible material of the invention, advantageously the use of fewer spacers improves the overall insulation capacity of the pipe-in-pipe assembly as compared with the use of more spacers, with the greatest improvement in insulation capacity obtained with the use of no spacers.

When the pipe-in-pipe assembly comprises at least one spacer, the spacer(s) can further comprise means for breaching or alteration of the container(s) by the breaching and alteration methods recited herein. For example, the spacer(s) can comprise a heating means, mechanical means, or chemical means to breach or alter the container(s) upon placement of the container(s) within the annulus or at any predetermined time thereafter.

The invention further provides an insulated pipe-in-pipe assembly comprising (a) at least one inner pipe with an exterior surface, (b) an outer pipe with an interior surface that is disposed around the at least one inner pipe, (c) an annular space between the interior surface of the outer pipe and the exterior surface of the at least one inner pipe, (d) a porous, resilient, compressible material disposed in the annular space, and (e) a remnant of a container that previously was positioned in the annular space and previously held the compressible material in a volume less than the volume of the compressible material in the annular space. The various elements of the insulated pipe-in-pipe assembly are as previously described herein.

The remnant of (or residue from) a container that previously held the compressible material can comprise the entire container after alteration, or any portion of the container after alteration. For example, if the alteration comprises a destructive alteration of the container, such as melting or irreversibly degrading at least a portion thereof, at least a portion of the container will remain in the annular space thereafter.

The invention additionally provides an insulated pipe-in-pipe system prepared in accordance with the method described herein. In particular, the invention provides an insulated pipe-in-pipe system comprising (a) two insulated pipe-in-pipe assemblies wherein the length of the at least one inner pipe is greater than the length of the outer pipe, and wherein the opposing ends of the inner pipe(s) extend beyond the opposing ends of the outer pipe, and wherein an end of the inner pipe(s) of one of the two insulated pipe-in-pipe assemblies is sealably connected to an end of the inner pipe(s) of the other of the two insulated pipe-in-pipe assemblies so that the inner pipes are abutting and in communication with one another for fluid flow therethrough, and (b) a sleeve in the form of a tubular structure having a bore which has a size to receive the pipe-in-pipe assemblies, wherein one end of the sleeve is sealably connected to the outer pipe of one of the two insulated pipe-in-pipe assemblies and the other end of the sleeve is sealably connected to the outer pipe of the other of the two insulated pipe-in-pipe assemblies. The insulated pipe-in-pipe system optionally further comprises an insulating material disposed in the space between the sleeve and the inner pipes of the two insulated pipe-in-pipe assemblies. The various elements of the insulated pipe-in-pipe assembly are as previously described herein.

The invention further provides an insulated pipe-in-pipe assembly comprising (a) at least one inner pipe with an exterior surface, (b) an outer pipe with an interior surface that is disposed around the at least one inner pipe, (c) an annular space between the interior surface of the outer pipe and the exterior surface of the at least one inner pipe, and (d) nanoporous silica disposed in the annular space, wherein the nanoporous silica has a density between 80 kg/m$^3$ and about 140 kg/m$^3$ and a thermal conductivity of about 20 mW/m·K or less (e.g., about 12 mW/m·K to about 20 mW/m·K) when measured between a surface at about 0° C. and a surface at about 25° C. The insulated pipe-in-pipe assembly can be prepared by the methods previously recited herein, and the nanoporous silica can be as previously recited herein. The thermal conductivity can be measured, for example, in accordance with ASTM C518.

The insulated pipe-in-pipe assemblies and systems of the invention are suitable for use in transporting any fluid wherein the fluid is or could be at a different temperature than the surrounding environment. For the purposes of this application, the term "fluid(s)" includes gases and/or liquids. The assemblies and systems of the invention are particularly useful in transporting hydrocarbons (e.g. crude oil and natural gas) from the point of extraction to storage or processing facilities, as well as for transporting liquefied natural gas from point-to-point.

EXAMPLE

This example further illustrates the invention but, of course, should not be construed as in any way limiting its scope.

Four different amounts of silica aerogel particles were placed into a Plexiglas cell having an interior volume of 20×20×1 cm. In Sample A (control), the silica aerogel particles were disposed in the cell without any compression. In Samples B, C, and D (invention), increasing amounts of the silica aerogel particles were disposed in the cell with increasing amounts of compression to fit the silica aerogel particles within the interior volume of the cell.

For each sample, the percent compression was determined from the silica aerogel particle volume before compression ($V_b$) and the silica aerogel particle volume after compression ($V_a$=working cell volume=400 cm³), i.e., the interior cell volume, using the following equation: Percent Compression= $[(V_b-V_a)/V_b]\times 100\%$. The bulk density of each sample was calculated by dividing the weight of the silica aerogel particles for a particular sample by the interior cell volume.

The thermal conductivity of each sample was determined using a parallel hotplate protocol in accordance with ASTM C518. The thermal conductivity, as well as the percent compression and bulk density, of each of Samples A-D are set forth in the Table.

TABLE

Thermal Conductivity vs. Percent Compression

| Sample | Percent Compression | Bulk Density (kg/m³) | Thermal Conductivity (mW/m · K) |
|---|---|---|---|
| A (control) | 0 | 86 | 18.0 |
| B (invention) | 20 | 103 | 15.7 |
| C (invention) | 33 | 113 | 14.0 |
| D (invention) | 45 | 124 | 14.2 |

As is apparent from the results set forth in the Table, the thermal conductivity exhibited by bulk aerogel particles desirably decreases as the percent compression of the aerogel particles increases to the range of at least about 30-40%. In particular, the aerogel particles at 33% and 45% compression exhibited approximately a 22% reduction in thermal conductivity as compared to aerogel particles under no compression.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the preceding embodiments) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise specified. No language in the specification should be construed as indicating any non-specified element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter described herein as permitted by applicable law. Moreover, any combination of the above-described elements in all possible variations thereof is encompassed by the invention unless otherwise indicated herein or otherwise clearly contradicted by context.

What is claimed is:

1. A method of preparing an insulated pipe-in-pipe assembly, which method comprises:
   (i) providing an assembly comprising:
      (a) at least one inner pipe,
      (b) an outer pipe that is positioned around the at least one inner pipe so as to create an annular space between the exterior surface of the at least one inner pipe and the interior surface of the outer pipe, and
      (c) at least two containers comprising porous, resilient, volumetrically compressible material consisting of porous particles, wherein the compressible material is restrained within the containers and have a first volume, wherein the first volume of the compressible material is less than the unrestrained volume of the compressible material, and wherein the at least two containers are disposed in the annular space; and
   (ii) altering the at least two containers to reduce the restraint on the compressible material to increase the volume of the compressible material to a second volume that is greater than the first volume, thereby forming an insulated pipe-in-pipe assembly.

2. The method of claim 1, wherein the method further comprises sealing each end of the pipe-in-pipe assembly so as to fully enclose the annular space.

3. The method of claim 1, wherein the compressible material at the second volume substantially fills the annular space.

4. The method of claim 3, wherein the compressible material at the second volume is under restraint, and wherein the unrestrained volume of the compressible material within the annular space is greater than the volume of the annular space.

5. The method of claim 4, wherein the unrestrained volume of the compressible material within the annular space is about 1% or more greater than the volume of the annular space.

6. The method of claim 1, wherein the porous particles include hydrophobic material, aerogel, silica aerogel, or nanoporous silica.

7. The method of claim 1, wherein the compressible material comprises particles having an average particle size of about 0.1 to about 5 mm.

8. The method of claim 1, wherein the annular space further comprises an opacifier selected from the group consisting of carbon black, titanium dioxide, zirconium silicate, and mixtures thereof.

9. The method of claim 1, wherein the at least two containers comprise a film comprised of a metal, a polymer, a copolymer, a fabric, or a combination thereof.

10. The method of claim 1, wherein altering the at least two containers comprises breaching the at least two containers.

11. The method of claim 10, wherein the breaching of the at least two containers is accomplished by heating, electrical resistive heating mechanical rupture, irradiation with an incident beam of radiation, application of a pressure differential, chemical means, or biochemical means.

12. The method of claim 1, wherein the compressible material is a means for transferring one or more of longitudinal or radial forces between the inner and outer pipes.

13. The method of claim 1, wherein one or more of the inner pipe and the outer pipe is made of a flexible material.

14. The method of claim 1, wherein the at least two containers have an elongate arched shape.

15. The method of claim 1, further comprising providing a spacer and positioning the spacer in the annular space.

16. The method of claim 1, wherein a number of spacers utilized in the insulated pipe-in-pipe assembly is less than a number that would be otherwise required in a pipe-in-pipe assembly produced using another method.

17. The method of claim 1, wherein no spacers are present in the annular space.

18. The method of claim 1, wherein the annular space, upon being fully enclosed, is at a pressure selected from the group consisting of substantially atmospheric pressure, below atmospheric pressure and greater than atmospheric pressure.

19. The method of claim 1, wherein the at least two containers are sealed containers, the compressible material in the at least two containers at the first volume is under a reduced pressure that is less than atmospheric pressure, the annular space has a pressure greater than the reduced pressure within the at least two containers, and the altering of the at least two containers comprises equalizing the pressure in the at least two containers with the pressure of the annular space to increase the volume of the compressible material to the second volume.

20. The method of claim 19, wherein the reduced pressure within the at least two containers is about 0.1 kPa to about 100 kPa.

21. An insulated pipe-in-pipe assembly prepared in accordance with the method of claim 1.

22. A method of preparing an insulated pipe-in-pipe assembly, which method comprises:
(i) providing an assembly comprising:
(a) at least one inner pipe,
(b) an outer pipe that is positioned around the at least one inner pipe so as to create an annular space between the exterior surface of the at least one inner pipe and the interior surface of the outer pipe, and
(c) at least one container comprising porous, resilient, volumetrically compressible material consisting of porous particles, wherein the compressible material is restrained within the container and has a first volume, wherein the first volume of the compressible material is less than the unrestrained volume of the compressible material, and wherein the at least one container is disposed in the annular space;
(ii) altering the at least one container to reduce the restraint on the compressible material to increase the volume of the compressible material to a second volume that is greater than the first volume, thereby forming an insulated pipe-in-pipe assembly; and
(iii) positioning additional insulation material in the annular space prior to altering the at least one container.

23. The method of claim 22, wherein the additional insulation material comprises a compressible material.

24. The method of claim 23, wherein the additional insulation material is a blanket comprising a material having a lofty fibrous structure and an aerogel.

25. A method of preparing an insulated pipe-in-pipe assembly, which method comprises:
(i) providing an assembly comprising:
(a) at least one inner pipe,
(b) an outer pipe that is positioned around the at least one inner pipe so as to create an annular space between the exterior surface of the at least one inner pipe and the interior surface of the outer pipe, and
(c) at least one container comprising porous, resilient, volumetrically compressible material consisting of porous particles, wherein the compressible material is restrained within the container and has a first volume, wherein the first volume of the compressible material is less than the unrestrained volume of the compressible material, and wherein the at least one container is disposed in the annular space;
(ii) altering the at least one container to reduce the restraint on the compressible material to increase the volume of the compressible material to a second volume that is greater than the first volume, thereby forming an insulated pipe-in-pipe assembly; and
(iii) adding at least one additional outer pipe, and wherein an additional annular space is present between the exterior surface of the outer pipe and the interior surface of the additional outer pipe, and wherein the additional annular space is occupied by a material selected from the group consisting of: air; porous, resilient, volumetrically compressible material; aerogel; blankets; fibers; blankets containing aerogel; polyurethane foam or glass beads.

26. The method of claim 1, wherein the at least two containers are mated through shaped elongated edges.

27. The method of claim 1, wherein the at least two containers are placed end to end.

* * * * *